United States Patent
Bhat

(10) Patent No.: US 11,953,918 B2
(45) Date of Patent: Apr. 9, 2024

(54) SPLIT CONTROL SYSTEM CONFIGURATION FOR UAV AUTOPILOT ARCHITECTURE

(71) Applicant: IDEAFORGE TECHNOLOGY PVT. LTD, Navi Mumbai (IN)

(72) Inventor: Ashish Bhat, Navi Mumbai (IN)

(73) Assignee: ideaForge Technology PVT. LTD (IN)

( * ) Notice: Subject to any disclaimer, the term of this patent is extended or adjusted under 35 U.S.C. 154(b) by 0 days.

(21) Appl. No.: 16/636,427

(22) PCT Filed: Jul. 27, 2018

(86) PCT No.: PCT/IB2018/055629
§ 371 (c)(1),
(2) Date: Feb. 4, 2020

(87) PCT Pub. No.: WO2019/025920
PCT Pub. Date: Feb. 7, 2019

(65) Prior Publication Data
US 2020/0174500 A1 Jun. 4, 2020

(30) Foreign Application Priority Data
Aug. 4, 2017 (IN) .............................. 201721027848

(51) Int. Cl.
*G05D 1/00* (2006.01)
*B64C 39/02* (2023.01)
(Continued)

(52) U.S. Cl.
CPC ............ *G05D 1/101* (2013.01); *B64C 39/024* (2013.01); *B64U 10/13* (2023.01); *B64U 50/19* (2023.01); *B64U 2201/10* (2023.01)

(58) Field of Classification Search
CPC .... G05D 1/101; G05D 1/0088; B64C 39/024; B64C 2201/027; B64C 2201/042; B64C 2201/141
See application file for complete search history.

(56) References Cited

U.S. PATENT DOCUMENTS 9,693,547 B1 * 7/2017 Moitier ................... A01M 5/02
2017/0115667 A1 * 4/2017 Marr ................. G08B 13/19695
(Continued)

FOREIGN PATENT DOCUMENTS

CN 202758242 U 2/2013

OTHER PUBLICATIONS

ArduPilot Autopilot Suite. User Documentation [online]. ArduPilot Dev Team, 2017 [retrieved on Mar. 6, 2021]. Retrieved from the Internet: <URL: https://web.archive.org/web/20170709195112/http://ardupilot.org/ardupilot> (Year: 2017).*

(Continued)

*Primary Examiner* — Peter D Nolan
*Assistant Examiner* — Peter Y Ning
(74) *Attorney, Agent, or Firm* — Taft Stettinius & Hollister LLP; Derek B. Lavender

(57) ABSTRACT

A split control system for UAV incorporating auto pilot is disclosed. Control system comprises a real-time low-level main processor, and a non-real-time high-level co-processor. The co-processor computes desired body rate values and feeds them to the main processor which may be with latency. Main processor computes one or more motor control signals based on the desired body rate values. The main processor also executes a rate damping loop algorithm based on instantaneous body rate values to generate one or more motor control signals to maintain stability of the UAV even in events of latency in desired body rate values from the co-processor. Instantaneous body rate values are either (Continued)

obtained directly from sensors without any latency or obtained by main processor indirectly with negligible latency. Main processor acts as an intermediate between sensors and co-processor by collecting raw sensor data and feeding the data to co-processor.

7 Claims, 3 Drawing Sheets

(51) Int. Cl.
*B64U 10/13* (2023.01)
*B64U 50/19* (2023.01)

(56) References Cited

U.S. PATENT DOCUMENTS

| | | | |
|---|---|---|---|
| 2017/0146995 A1* | 5/2017 | Stamatovski | G07C 5/008 |
| 2017/0147008 A1 | 5/2017 | Mere et al. | |
| 2017/0205826 A1* | 7/2017 | Smith | G01C 11/025 |
| 2017/0301111 A1* | 10/2017 | Zhao | G06T 7/80 |
| 2019/0250641 A1* | 8/2019 | Beer | G05D 1/106 |
| 2020/0117220 A1* | 4/2020 | Paglieroni | G08G 5/0052 |

OTHER PUBLICATIONS

Nvidia Jetson TX1 System-on-Module Datasheet v0.9. Aug. 2015. [retrieved on Oct. 8, 2022]. Retrieved from the Internet: <URL: https://static6.arrow.com/aropdfconversion/b29b9013fdac98b0c905c39535d2caa498597616/jetsontx1_module_datasheet_ds07224010_v_0_9.pdf> (Year: 2015).*

ArduPilot Autopilot Suite. User Documentation [online]. ArduPilot Dev Team, Jul. 9, 2017 [retrieved on Mar. 6, 2021, revised on Dec. 30, 2021]. Retrieved from the Internet: <URL: https://web.archive.org/web/20170709195112/http://ardupilot.org/ardupilot> (Year: 2017).*

Smolyanskiy, N. et al., Project Redtail, Nvidia GPU Technology Conference, May 8-11, 2017, Session #S7172. [retrieved on Dec. 28, 2021]. Retrieved from the Internet: <URL:https://on-demand.gputechconf.com/gtc/2017/presentation/s7172-nikolai-smolyanskiy-autonomous-drone-navigation-with-deep-learning.pdf> (Year: 2017).*

Ermakov, V., ROS Wiki—mavros package [online] Aug. 1, 2017 [retrieved on Dec. 28, 2021]. Retrieved from the Internet: <URL: https://web.archive.org/web/20170801220944/http://wiki.ros.org/mavros> (Year: 2017).*

Ermakov, V., mavlink/mavros Release 0.19.0 source code file: setpoint_mixin.h, [online], May 5, 2017 [retrieved on Dec. 29, 2021]. Retrieved from the Internet: <URL: https://github.com/mavlink/mavros/releases/tag/0.19.0> (Year: 2017).*

ArduPilot Autopilot Suite. User Documentation—Stabilize Mode [online]. ArduPilot Dev Team, Jul. 17, 2017 [retrieved on Mar. 24, 2023]. Retrieved from the Internet: <URL: https://web.archive.org/web/20170717234515/http://www.ardupilot.org/copter/docs/stabilize-mode.html> (Year: 2017).*

GCS (Ground Control Station) Failsafe—Copter Documentation, ArduPilot User Documentation [online]. ArduPilot Dev Team, Jul. 13, 2017 [retrieved on Nov. 6, 2023]. Retrieved from the Internet: <URL:https://web.archive.org/web/20170713020227/https://ardupilot.org/copter/docs/gcs-failsafe.html> (Year: 2017).*

Klenke Robert, "Development of a Novel, Two-Processor Architecture for a Small UAV Autopilot System", Research Agreement No. W911NF-05-1-0324 Final Report, May 7, 2006 (Jul. 5, 2006) . pp. 3-6.

* cited by examiner

SPLIT CONTROL SYSTEM CONFIGURATION FOR UAV AUTOPILOT ARCHITECTURE

This application is a national phase entry of PCT/IB2018/055629 filed on Jul. 27, 2018 which claims the benefit of Indian Application No. 201721027848 filed Aug. 4, 2017. The disclosures of which are hereby incorporated herein in their entirety.

TECHNICAL FIELD

The present disclosure relates generally to the field of Unmanned Arial Vehicles (UAVs). In particular, the present disclosure provides a split control system configuration for UAV autopilot architecture.

BACKGROUND

Background description includes information that may be useful in understanding the present invention. It is not an admission that any of the information provided herein is prior art or relevant to the presently claimed invention, or that any publication specifically or implicitly referenced is prior art.

An unmanned aerial vehicle (UAV), commonly known as a drone, is an aircraft without a human pilot aboard. They incorporate an autopilot system that usually receives signals from one or more sensors, processes the received signals, and generates suitable motor commands as output values based on mission requirements. UAV autopilot (also referred to as control system) is typically embodied within either a single microcontroller, or a combination of a microcontroller and a microprocessor, or a single microprocessor, or dual microprocessors.

In case where a single microcontroller is used for an UAV autopilot system, computationally intensive estimation and control logic algorithms cannot be implemented in conjunction as processing capability of the microcontroller is limited. In addition, it is very difficult to run computationally intensive navigation algorithms on a single microcontroller.

Where a combination of a microcontroller and a microprocessor is used for UAV autopilot/control system, all control and estimation logic are processed by the micro controller and the microprocessor performs computation intensive navigation algorithms, thus, utilizing efficient processing capability of both the microcontroller and the microprocessor. However, ability to handle complexity of the estimation and control logics used on-board remains limited.

When a single microprocessor is used with an UAV autopilot system, the microprocessor is a non-real time microprocessor and since the computations are not processed in real-time, a latency or a delay is introduced which compromises the flight control.

When dual processors are used for an UAV autopilot system, a primary processor is involved in acquiring data from one or more sensors, estimation of state data and controlling logic parameters which generally has a small latency. A secondary processor is responsible for running all other computationally intensive algorithms. However, configuration of dual processors is not preferred because this configuration considerably increases power consumption of UAV control system and affects flight time.

There is, therefore, a need to address above mentioned problems and provide a split control system configuration for UAV autopilot systems that allows use of wide range of algorithms with greater accuracy without compromising efficiency of the UAV autopilot system.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about". Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide a UAV control system having minimal probability of exceptions and failures.

Another object of the present disclosure is to provide a UAV control system that utilizes optimal processing capabilities of its components.

Another object of the present disclosure is to provide a UAV control system that has improved interfacing with high level peripherals such as LAN and WIFI.

Another object of the present disclosure is to provide a UAV control system that ensures stability of the system.

Another object of the present disclosure is to provide a UAV control system that reduces power consumption of the system.

Another object of the present disclosure is to provide a UAV control system that improves accuracy of the system without compromising efficiency.

These and other objects of the present invention will become readily apparent from the following detailed description taken in conjunction with the accompanying drawings.

SUMMARY

Aspects of the present disclosure relates to autopilot/control system of an Unmanned Ariel Vehicles (UAVs). In particular, the present disclosure provides a split control system configuration for UAV autopilot architecture that overcomes limitations of conventional architecture in use in the related art.

In an aspect, the present disclosure provides architecture for UAV autopilot control system, wherein the control system includes a real time main processor such as a low level microcontroller, and a non-real-time co-processor such as a high level microprocessor. Desired body rate values are computed in the high-level processor and are fed to the low-level micro-controller which may have latency. The main processor executes a rate damping loop algorithm ensuring UAV system stability even in events of latency in the desired body rate values from the co-processor due to its nature.

In an aspect, rate damping loop algorithm is executed in main processor using instantaneous body rate values to generate one or more motor control signals that maintain stability of UAV.

In an aspect, complex algorithms including, but not limited to, state estimation, flight control and mission control are also computed by high-level co-processor.

In an aspect, main processor also computes one or more motor control signals based on the desired body rate values fed by the co-processor; however, these may have latency in view of nature of the co-processor.

In an aspect, main processor and co-processor communicate via a dedicated bus.

In an aspect, the main processor acts as an intermediate between one or more sensors and the co-processor by collecting raw sensor data and feeding the raw sensor data to the co-processor.

In an aspect, instantaneous body rate values are either obtained directly from one or more sensors or are obtained indirectly with negligible latency, wherein latency of the desired body rate values is bound within a limited range to ensure stability of UAV.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
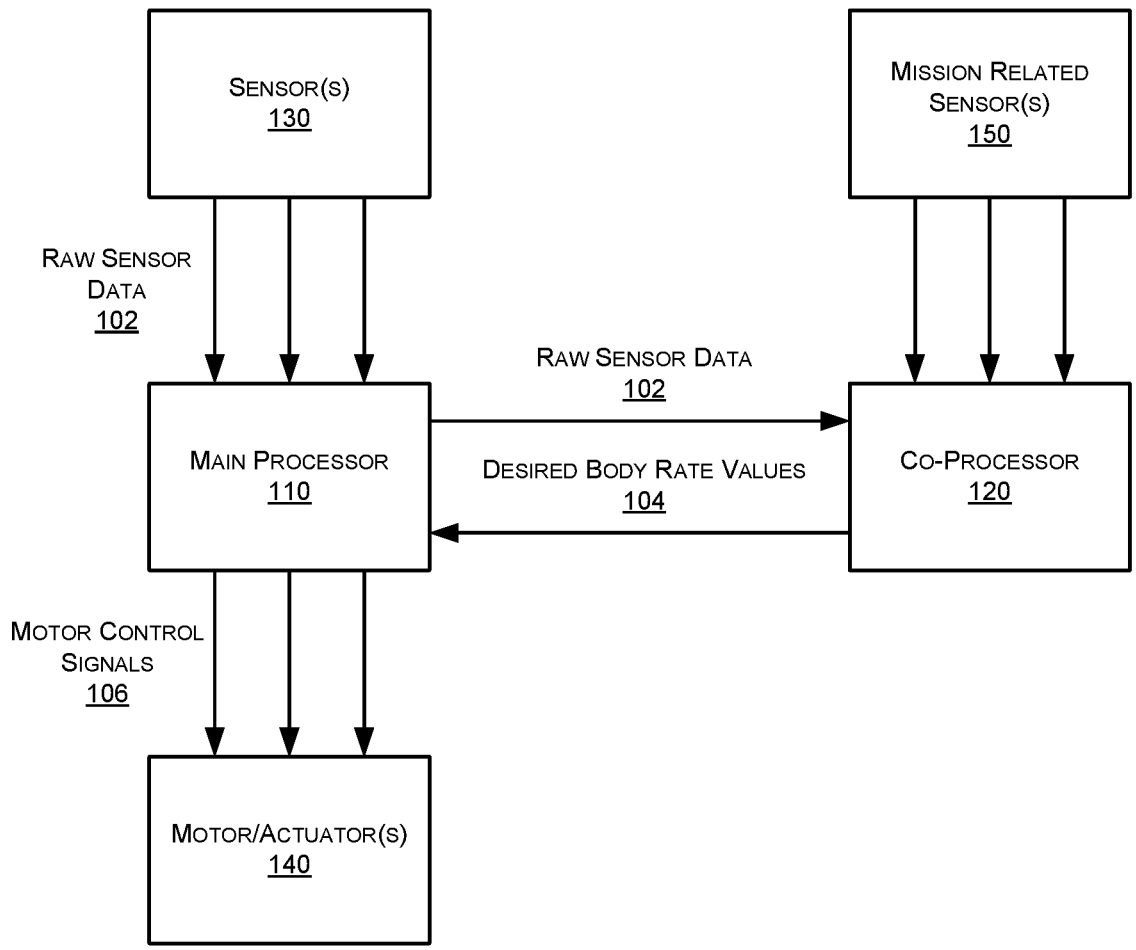
FIG. 1 illustrates an exemplary schematic illustration of proposed split control system configuration in accordance with embodiments of the present disclosure.

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Unless the context requires otherwise, throughout the specification which follow, the word "comprise" and variations thereof, such as, "includes" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

Various terms as used herein. To the extent a term used in a claim is not defined, it should be given the broadest definition persons in the pertinent art have given that term as reflected in printed publications and issued patents at the time of filing.

Reference will now be made in detail to the exemplary embodiments of the present disclosure, examples of which are illustrated in the accompanying drawings. Wherever possible, the same reference numbers are used in the drawings and the description to refer to the same or like parts.

The following discussion provides many example embodiments of the inventive subject matter. Although each embodiment represents a single combination of inventive elements, the inventive subject matter is considered to include all possible combinations of the disclosed elements. Thus if one embodiment includes elements A, B, and C, and a second embodiment includes elements B and D, then the inventive subject matter is also considered to include other remaining combinations of A, B, C, or D, even if not explicitly disclosed.

Embodiments explained herein relate to autopilot control system for UAVs. In particular they pertain to architecture for the autopilot control system. In an aspect, the present disclosure provides a split architecture or control system for UAV, wherein the control system includes a main processor and a co-processor, and wherein main processor executes a rate damping loop algorithm, and co-processor computes complex algorithms including, but not limited to, state estimation, flight control and mission control.

In an aspect, main processor is a real-time low level microcontroller and co-processor is a non-real-time high level microprocessor, and the main processor and the co-processor communicate via a dedicated bus.

In an aspect, the co-processor computes desired body rate values and feeds the desired body rate values to the main processor, and due to its nature desired body rate values may be received by the main processor with latency. The main processor computes one or more motor control signals based on the desired body rate values. However, stability of UAV is maintained in spite of latency that may exist in the desired body rate values, by execution of a rate damping loop algorithm by the main processor.

In an aspect, the main processor acts as an intermediate between one or more sensors and the co-processor by collecting raw sensor data and feeding the raw sensor data to the co-processor.

In an aspect, instantaneous body rate values are either obtained directly from one or more sensors or are obtained indirectly with negligible latency, wherein latency of the desired body rate values is bound within a limited range to ensure stability of UAV.

It would be appreciated by those skilled in the art that by the proposed architecture utilizes processing capabilities of both low level microcontroller and high level microprocessor optimally ensuring improved stability of UAV in spite of latency associated with desired body rate values.

FIG. 1 illustrates an exemplary schematic illustration of proposed split control system configuration in accordance with embodiments of the present disclosure. In an aspect, main processor 110 (also referred to as low level microcontroller hereinafter) operates as an intermediary between one or more sensors 130 and a co-processor 120 (also referred to as high level microprocessor hereinafter) by collecting raw sensor data 102 from the one or more sensors 130 and feeding it to the high level microprocessor 120.

In an aspect, the low level microcontroller 110 provides motor control signals 106 (also referred to as motor PWM Signal hereinafter) as an input to one or motors and/or actuators 140 so as to ensure stability and control movement of the UAV.

In an aspect, high level microprocessor 120 can have a higher clock speed and processing throughput than low level microcontroller 110. In an embodiment, high level microprocessor 120 is interfaced to mission related sensors 150 including, but not limited to, high resolution video cameras, RADAR, and LIDAR.

In an embodiment, low-level microcontroller 110 can be interfaced with one or more sensors 130 that include an inertial measurement unit containing solid state gyroscopic sensors and accelerometers for determining attitude of UAV within three dimensions of pitch, roll, and yaw. The low level microcontroller 110 can also be interfaced with a Global Positioning System (GPS) receiver which provides both position and velocity information. Further, in conjunction, other sensors including, but not limited to, magnetic compass, airspeed sensor, altitude sensor and surface pressure sensor are also interfaced with the low level microcontroller 110.

In an aspect, high-level microprocessor 120 can be configured to compute complex algorithms using raw sensor data 102 fed by low level microcontroller 110 including, but not limited to, flight control, mission control and state estimation. In an aspect, complex algorithms related to flight control include implementation of computationally intensive control loops that measure roll, pitch, yaw, horizontal position, speed and altitude of UAV along with rates of change of these quantities to determine required positions of control surfaces of the UAV to bring the UAV to a desired state of heading, speed, position, and altitude.

In an aspect, complex algorithms related to mission control can include search control loops to find shortest flight path to visit a specific set of waypoints for surveillance, developing most efficient search pattern under given current wind and weather conditions, vision based navigation, obstacle avoidance algorithms, or implementing adaptive, artificial intelligence control algorithms for autonomous, collaborative swarming of multiple UAVs in combat support operations.

In an embodiment, as computationally intensive state estimation algorithms can be processed and executed in high level microprocessor 120, improved accuracy of UAV flight control and mission control computations are achieved.

In an embodiment, after computation of complex algorithms in high level microprocessor 120, desired body rate value 104 are generated and fed into low level microcontroller 110.

As can be appreciated, due to nature of processing by high level processor 120, desired body rate values generated in high level processor 120 may have a finite latency when fed to low level processor 110, and may result in tending to affect stability of UAV. This latency is a delay before transfer of desired body rate values 104 actually begins following instruction of the transfer of the desired body rate values 104 to the low level processor 110.

In an embodiment, stability of UAV can be ensured even in events of latency in desired body rate by executing a rate damping loop in low level microcontroller 110, which can generate a desired motor control signal 106 and is provided as input to motor and/or actuator 140.

In an embodiment, rate damping loop in low level microcontroller 110 is executed using below shown formula:

$$\begin{bmatrix} L \\ M \\ N \end{bmatrix} = \begin{bmatrix} Kp & 0 & 0 \\ 0 & Kq & 0 \\ 0 & 0 & Kr \end{bmatrix} \begin{bmatrix} p_{-d} - p \\ q_{-d} - q \\ r_{-d} - r \end{bmatrix}$$

However, the rate-damping loop can be executed with other similar controls.

In an embodiment, motor control signal generated as output from low level microcontroller 110 is executed using below shown formula:

Motor PWM signal=Control Allocation Matrix×Required moments where,

L, M & N are the required moment values in roll, pitch and yaw axis,

Kp, Kq & Kr are loop gains, $p_{-d}$, $q_{-d}$ & $r_{-d}$ are desired body rate values, p, q & r being instantaneous body rate values.

In an embodiment, only desired body rate values 104 have an effective latency or lag due to execution in high level microprocessor 120 and there is no latency or lag in respect of instantaneous body rate values (used in above formula for executing rate damping loop) since rate damping loop algorithm is executed in low level microcontroller 110.

In an embodiment, instantaneous body rate values are either obtained directly from one or more sensors 130 without any latency or are obtained indirectly with negligible latency by low level processor 110.

Figure 2A:
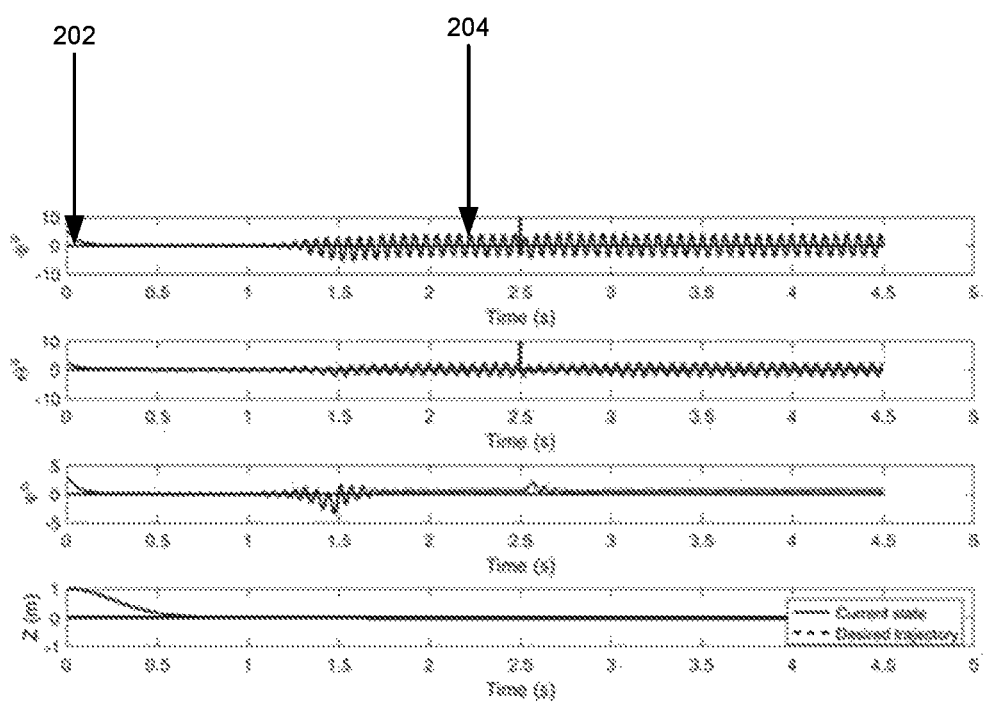
FIG. 2A illustrates result of simulation of a system wherein a non-real-time microprocessor is configured as on-board autopilot for UAV in accordance with embodiments of the present disclosure.

FIG. 2A illustrates result of simulation of a system wherein a non-real-time microprocessor is configured as on-board autopilot for UAV wherein a non-real-time high-level microprocessor 120 is onboard autopilot for UAV with 20-time steps latency in all states. It is evident from FIG. 2A that in the simulation, the UAV becomes unstable since deviations between current state 202 and desired trajectory 204 of UAV are clearly large. Additionally, perturbations induced in roll and pitch axis takes considerable amount of time to diminish, thus, reducing stability of UAV.

In an embodiment, in simulation as depicted in FIG. 2A, estimation and control loop runs at 400 Hz i.e., a single time step is 0.0025 seconds, and hovering condition is simulated and after a finite time, an external perturbation of 10 degree is induced in both roll and pitch axis. Further, latency in all states are maintained at 20-time steps.

Figure 2B:
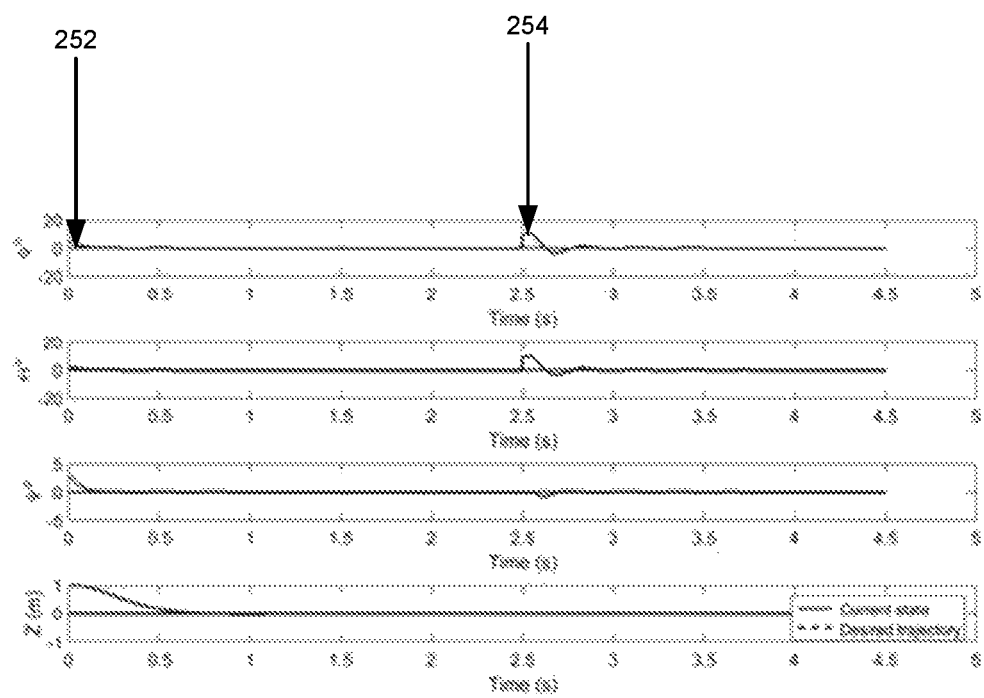
FIG. 2B illustrates result of simulation of proposed split control system for UAV in accordance with embodiments of the present disclosure.

FIG. 2B illustrates result of simulation of proposed split control system for UAV with 20-time steps latency in all states in accordance with embodiments of the present disclosure. It is evident from FIG. 2B that in this simulation, deviations between current state 252 and desired trajectory 254 of UAV are small. Additionally, perturbations induced in roll and pitch axis diminish in a short time interval, thus improving stable of the UAV.

In an embodiment, in simulation as depicted in FIG. 2B, estimation and control loop runs at 400 Hz i.e., a single time step is 0.0025 seconds, and hovering condition is simulated and after a finite time, an external perturbation of 10 degree is induced in both roll and pitch axis. Further, latency in all states is maintained at 20-time steps.

In an embodiment, during design of proposed split control system for UAV autopilot architecture of the proposed invention, design is made taking into consideration amount of latency of body rate values that the system can handle for a stable system. In an embodiment, proposed system of split control configuration for UAV autopilot architecture is stable at lower latency band and becomes unstable if latency crosses a critical limit.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a UAV control system having minimal probability of exceptions and failures, since computations processed by microcontroller are less.

The present disclosure provides a UAV control system that utilizes optimal processing capabilities of its components.

The present disclosure provides a UAV control system that has improved interfacing with high level peripherals such as LAN and WIFI.

The present disclosure provides a UAV control system that ensures stability of the system.

The present disclosure provides a UAV control system that reduces power consumption of the system.

The present disclosure provides a UAV control system that improves accuracy of the system without compromising efficiency of the system.

I claim:

1. A control system for a UAV incorporating autopilot, the control system comprising:
    a main processor; and
    a co-processor;
    wherein the co-processor computes desired body rate values based on mission control algorithms selected from a combination of flight control, mission control, search control loop, and state estimation techniques, and feeds the desired body rate values to the main processor, and the main processor computes one or more motor control signals based on the desired body rate values;

wherein the main processor executes a rate damping loop algorithm, by determining moments values in roll, pitch, and yaw axis of the UAV based on instantaneous body rate values obtained from one or more sensors and based on the desired body rate values from the co-processor, to diminish perturbations in the roll axis and the pitch axis of the UAV due to a latency associated with the desired body rate values from the co-processor, and wherein the latency is below a predetermined threshold, wherein the execution of the rate damping loop algorithm generates a control signal to provide input to an actuator of the UAV, wherein the main processor acts as an intermediate between the one or more sensors and the co-processor by collecting raw sensor data and feeding the raw sensor data to the co-processor for determination of the body rate values, and wherein the co-processor has higher clock speed and processing throughput than the main processor, wherein a design architecture of the control system is based on an amount of the latency of body rate values that the UAV can handle for a predetermined stability of operations, and wherein the predetermined stability is defined by an amount of perturbations that can be diminished by the execution of rate damping loop algorithm in a predetermined time interval.

2. The system as claimed in claim 1, wherein latency of the desired body rate values from the co-processor is bound within a limited range to ensure stability of the UAV.

3. The system as claimed in claim 1, wherein said main processor is a real-time low-level microcontroller.

4. The system as claimed in claim 1, wherein said co-processor is a non-real-time high-level microprocessor.

5. The system as claimed in claim 4, wherein the co-processor computes complex algorithms including any one or a combination of state estimation, flight control and mission control.

6. The system as claimed in claim 1, wherein the latency is up to 20 time steps.

7. The system as claimed in claim 6, wherein each time step is about 0.0025 seconds.

* * * * *